UNITED STATES PATENT OFFICE.

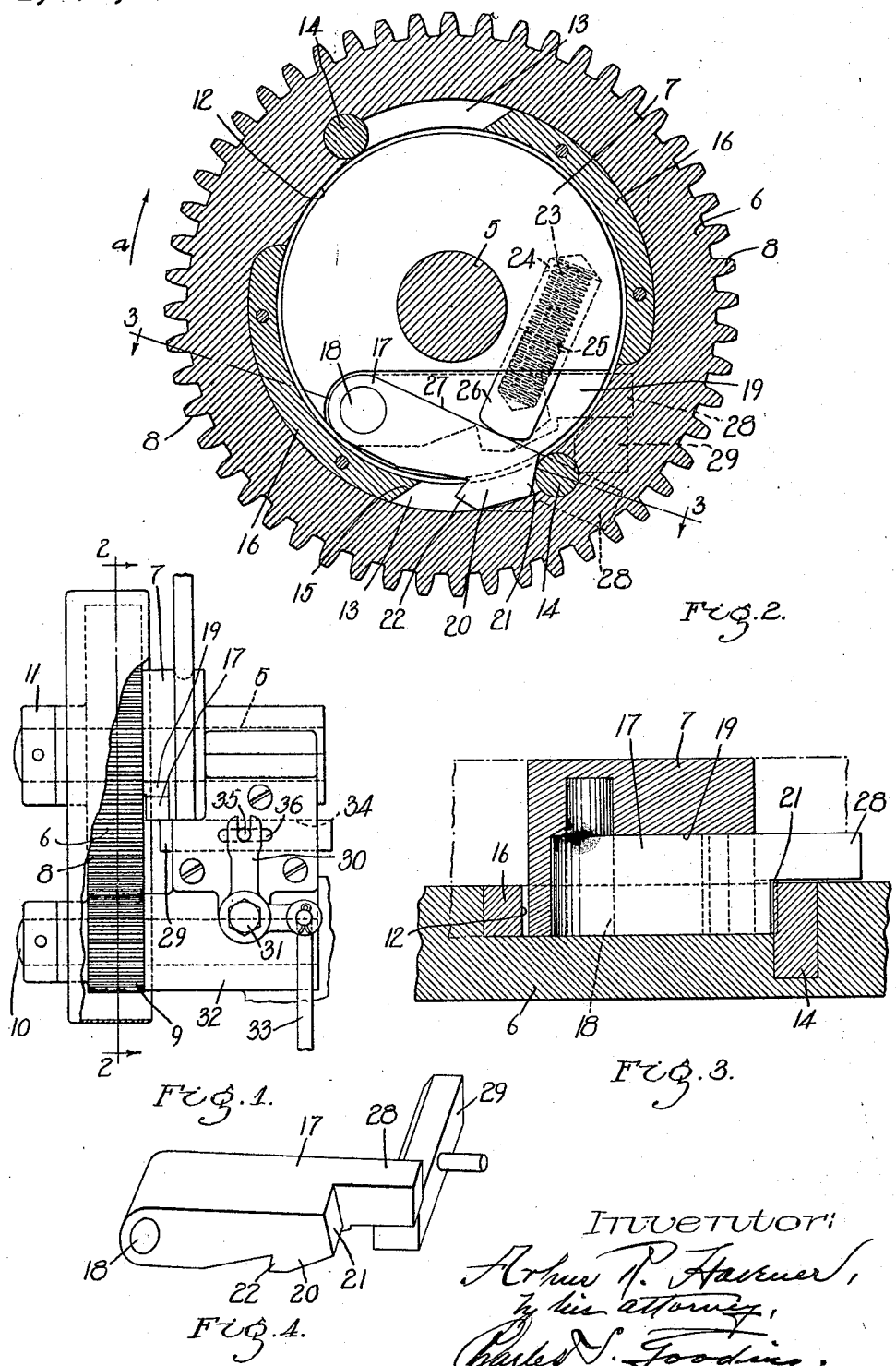

ARTHUR R. HAVENER, OF WAYLAND, MASSACHUSETTS, ASSIGNOR TO JUDSON L. THOMSON MFG. CO., A CORPORATION OF MASSACHUSETTS.

CLUTCH MECHANISM.

1,274,879.  Specification of Letters Patent.  Patented Aug. 6, 1918.

Application filed March 4, 1918. Serial No. 220,195.

*To all whom it may concern:*

Be it known that I, ARTHUR R. HAVENER, a citizen of the United States, residing at Wayland, in the county of Middlesex and State of Massachusetts, have invented new and useful Improvements in Clutch Mechanism, of which the following is a specification.

This invention relates to a clutch and is particularly adapted for use in machines in which the resistance to rotation of the driving shaft at certain portions of said rotation is considerably greater than at other portions thereof, as, for example, in riveting and lacing hook setting machines wherein at a certain time during the rotation of the driving shaft the rivet or lacing hook is being set and at that time much greater resistance to the rotation of the driving shaft is encountered than at other points or angles of the rotation of said shaft. In such machines as soon as the rivet or lacing hook has been set and the shaft continues to rotate it will tend to jump quickly ahead when freed from the excessive resistance which it had previously encountered and thus make the movements of the different parts and mechanisms of the machine irregular and jerky, which is very objectionable, as it is desirable that all of the parts should move with regularity and evenness of motion in order that the work of the machine may be properly performed, such work, for instance, as feeding the rivet or lacing hook.

The device of this invention embodies two principal elements, viz., a driving member and a driven member, the driving member being loosely mounted upon the shaft and the driven member being fast to the shaft. These two parts are connected together when so desired by a dog which is carried by the driven member and is adapted to project into a recess in the adjacent face of the driving member. The opposite ends of this recess are so formed and arranged that in the operation of the machine one end of the recess engages the dog to actuate the driven member while the other end of the recess engages the dog in case the driven member starts to jump ahead of the driving member when the excessive resistance to the rotation of the shaft hereinbefore described is removed.

The novelty of the invention resides particularly in providing means on the driving member to catch the dog when the driven member is released from excessive resistance and prevent the driven member from jumping ahead in its movement to any substantial extent.

With these ends in view the invention consists in the combination and arrangement of parts set forth in the following specification and particularly pointed out in the claims.

Referring to the drawings:

Figure 1 is a side elevation of a clutch embodying my invention, the frame of the machine upon which it is mounted being shown broken away.

Fig. 2 is a sectional elevation taken on line 2—2 of Fig. 1.

Fig. 3 is a detail sectional elevation taken on line 3—3 of Fig. 2.

Fig. 4 is a perspective view of a dog showing the same in engagement with one end of the stop slide.

Like numerals refer to like parts throughout the several views of the drawings.

In the drawings, 5 is the clutch shaft, 6 the driving member and 7 the driven member. The driving member 6 is loosely mounted to rotate upon the clutch shaft 5. The driven member 7 is rigidly fastened to said shaft. The driving member 6 is provided upon its periphery with gear teeth 8 which mesh into a pinion 9 on a shaft 10 which is rotated by any suitable means such, for example, as a pulley. The driving member 6 is prevented from moving longitudinally upon the clutch shaft 5 by a collar 11 fast to the shaft 5 at one side of said driving member and by the driven member 7 on the opposite side of said driving member.

The driving member 6 is provided with an annular chamber 12 into which the driven member projects and within the walls of this annular chamber 12 are provided two recesses 13, one end of each of the recesses 13 terminating in a pin 14, preferably made of hardened steel. The other end of each of said recesses terminates in a tooth 15 formed on one end of the segmental plate 16 which is fastened to the driving member 6.

A dog 17 is pivoted at 18 to the driven member 7 and lies in a chamber 19 in the driven member 7. Said dog 17 is provided with a tooth 20, one end 21 of said tooth being adapted to be engaged by the pin 14 which forms one end of the recess 13, the other end 22 of said tooth being adapted to engage the tooth 15 on the plate 16 whenever the driven member moves faster than the driving member.

A spring 23 is inclosed within a hole 24 formed in the driven member 7, one end of said spring projecting into the recess 25 formed in a follower 26, the outer end of said follower being arranged to bear against the back edge 27 of the dog 17 and normally to hold said dog with the tooth 20 projecting into one of the recesses 13 in the driving member 6.

The dog 17 has a projection 28 on its outer end which extends along the outside of one face of the driving member 6, as seen in Fig. 1. The dog is thrown out of engagement with the driving member by this projection 28 when it encounters a stop 29 consisting of a slide which is adapted to be moved into or out of the path of the projection 28 on the dog 17 by means of a lever 30 pivoted at 31 to the frame 32 and engaging a pin 35 which is fastened to the slide 29 and projects through a slot 36 in the frame of the machine. Said lever is actuated by means of a rod 33 which is connected to a treadle (not shown in the drawings) whereby the slide 29 may be moved to slide in ways 34 in the frame of the machine so as to project at its left hand end (Fig. 1) into the path of the projection 28 on the dog 17, and when this occurs the dog will be thrown out of engagement with the driving member 6 from the position shown in full lines to the position shown in dotted lines (Fig. 2), the edge 27 of the dog 17 abutting under such circumstances against the upper edge of the chamber 19 in the driven member 7, thus causing the driven member 7 and the shaft 5 to which it is fastened to stop while the driving member continues to rotate in the direction of the arrow a, Fig. 1.

The general operation of the device hereinbefore specifically and to some extent in general described is as follows: Assuming the parts to be in the relative positions illustrated in Fig. 1, the driving member being rotated by the pinion 9 and gear 8 in the direction of the arrow a, it will be seen that the stop slide 29 is in engagement with the projection 28 upon the dog 17 and that the dog is in the position illustrated in dotted lines in Fig. 2, the driven member and the shaft 5 to which it is attached being stationary. When it is desired to throw the clutch into operation so that the shaft 5 will be rotated, the operator depresses the treadle, moves the rod 33 downwardly and rocks the lever 30 to move the stop slide 29 toward the right (Fig. 1). This releases the dog 17, which is immediately thrown outwardly by the spring 23 and spring follower 26, so that as the driving member 6 continues in its rotation one of the recesses 13 will be brought into alinement with the tooth 20 on the dog 17. Thereupon the dog will be moved by the spring follower 26 to the position illustrated in Fig. 2, with the tooth 20 projecting into one of the recesses 13, and the pin 14 forming one end of said recess 13 will engage the end of the dog or of the tooth 20 and will impart a rotary movement to the driven member 7 and to the shaft 5.

Asuming, now, that the machine arrives at a certain point in its cycle of operations in which the shaft 5 encounters considerable resistance to rotation and that just as it passes this point and the excessive resistance to the rotation of the shaft 5 is eliminated, the driven member 7 starts forward in the direction of the arrow a at a speed greater than that of the driving member 6, it follows that the end 22 of the tooth 20 will engage the tooth 15 on the plate 16 and the excess speed of the driven member will then be checked, whereupon the pin 14 will again catch up with the dog and the parts will assume the relative positions illustrated in Fig. 2, with the pin 14 driving the driven member 7, through the dog 17.

As soon as it is desired to stop the machine the operator moves the stop slide 29 into the position illustrated in Fig. 1 and as soon as the projection 28 is brought around so as to engage said stop slide the dog 17 will be thrown out of engagement with the driven member from the position shown in full lines, Fig. 2, to that shown in dotted lines therein, and the driven member with its shaft 5 and all parts driven by said shaft 5 in the machine to which the clutch is applied will come to a stop.

Having thus described my invention, what I claim and desire by Letters Patent to secure is:

1. A clutch mechanism having, in combination, a driving member, a driven member, a dog mounted on said driven member and adapted to project into a recess in said driving member, the opposite ends of said recess each being adapted to engage said dog and hold it against movement in one direction relatively thereto and means adapted to move said dog to cause the same to project into said recess, whereby said driven member may be locked to said driving member and driven thereby and means to move said dog out of said recess.

2. A clutch mechanism having, in combination, a driving member, a driven member, a shaft fast to said driven member, a dog pivoted to said driven member, a projection on said dog adapted to project into a recess in said driving member, the opposite ends of said recess each being adapted to engage said projection and hold said dog against movement in one direction relatively thereto and means on said driven member adapted to move said dog to cause said projection to enter said recess, whereby said driven member may be locked to said driving member and driven thereby and means to actuate said dog to move said projection out of said recess.

3. A clutch mechanism having, in combination, a driving member, a driven member, a dog pivoted on said driven member, said dog having a tooth at one end thereof adapted to project into a recess in said driving member and to be engaged by the opposite ends of said recess and means on said driven member adapted to move said dog to cause the same to project into said recess, whereby said driven member may be locked to said driving member and driven thereby and means to throw said dog out of engagement with said driving member.

4. A clutch mechanism having, in combination, a driving member, a driven member, a dog pivoted on said driven member and adapted to project into a recess in said driving member, one end of said recess being adapted to abut against the end of said dog, a tooth terminating the other end of said recess, a tooth on said dog adapted to engage the tooth on said driving member, and means on said driven member adapted to move said dog to cause the same to project into said recess, whereby said driven member may be locked to said driving member and driven thereby and means to throw said dog out of engagement with said driving member.

5. A clutch mechanism having, in combination, a shaft, a driving member mounted to rotate upon said shaft, a driven member fast to said shaft, said driving member having an annular chamber therein into which said driven member projects, a dog pivotally mounted on said driven member and adapted to project into a recess in said driving member, a pin extending transversely of said driving member and forming one end of said recess, a segmental plate extending transversely of said driving member and forming the other end of said recess, said pin being adapted to abut against the end of said dog to rotate said driven member, a tooth on said dog adapted to engage said plate to prevent said driven member from rotating relatively to said driving member in the direction in which said driving member is rotating, means on said driven member adapted to move said dog to cause the same to project into said recess, whereby said driven member may be locked to said driving member and driven thereby, and means to throw said dog out of engagement with said driving member.

In testimony whereof I have hereunto set my hand in presence of two subscribing witnesses.

ARTHUR R. HAVENER.

Witnesses:
CHARLES S. GOODING,
SYDNEY E. TAFT.

Copies of this patent may be obtained for five cents each, by addressing the "Commissioner of Patents, Washington, D. C."